US010790702B2

(12) United States Patent
Kanagawa et al.

(10) Patent No.: US 10,790,702 B2
(45) Date of Patent: Sep. 29, 2020

(54) CONTACTLESS POWER TRANSMISSION DEVICE AND CONTACTLESS POWER TRANSMISSION/RECEPTION APPARATUS

(71) Applicant: TOSHIBA TEC KABUSHIKI KAISHA, Shinagawa-ku, Tokyo (JP)

(72) Inventors: Masahiro Kanagawa, Kobe Hyogo (JP); Masakazu Kato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 771 days.

(21) Appl. No.: 15/492,210

(22) Filed: Apr. 20, 2017

(65) Prior Publication Data
US 2017/0317532 A1 Nov. 2, 2017

(30) Foreign Application Priority Data

Apr. 28, 2016 (JP) .................... 2016-090100

(51) Int. Cl.
*H02J 50/12* (2016.01)
*H02J 7/02* (2016.01)
(Continued)

(52) U.S. Cl.
CPC ............. *H02J 50/12* (2016.02); *H01F 27/02* (2013.01); *H01F 27/36* (2013.01); *H01F 38/14* (2013.01);
(Continued)

(58) Field of Classification Search
CPC .......... H02J 50/12; H02J 50/90; H02J 7/0044; H02J 7/025
(Continued)

(56) References Cited

U.S. PATENT DOCUMENTS

2001/0011912 A1\* 8/2001 Inukai ................. G06F 1/10
327/141
2010/0065352 A1 3/2010 Ichikawa
(Continued)

FOREIGN PATENT DOCUMENTS

DE 102014106947 11/2015
JP 8-91467 4/1996
(Continued)

OTHER PUBLICATIONS

Chinese Office Action for Chinese Patent Application No. 201710265656.X dated Sep. 24, 2019.
(Continued)

*Primary Examiner* — Rexford N Barnie
*Assistant Examiner* — Toan T Vu
(74) *Attorney, Agent, or Firm* — Amin, Turocy & Watson, LLP

(57) ABSTRACT

A contactless power transmission device transmits power to a power reception device in a contactless manner, and includes a shield case which has an opening portion at one end portion thereof, and is partitioned into a plurality of shield rooms by partitioning plates; a power transmission circuit which is for transmitting power and is disposed to correspond to each of the plurality of shield rooms; a plurality of power transmission coils which are disposed on the inner side in the plurality of shield rooms and transmit AC power from the power transmission circuit to the power reception device; and a notch which is formed on side surfaces of the shield case or the partitioning plates, from the opening portion toward the inner side such that both sides of a rear end portion of the power reception device inserted into the plurality of shield rooms can be held.

5 Claims, 12 Drawing Sheets

(51) Int. Cl.
  *H02J 50/90* (2016.01)
  *H02J 50/70* (2016.01)
  *H02J 50/10* (2016.01)
  *H02J 50/40* (2016.01)
  *H01F 38/14* (2006.01)
  *H01F 27/02* (2006.01)
  *H01F 27/36* (2006.01)
  *H02J 7/00* (2006.01)

(52) U.S. Cl.
  CPC .............. *H02J 7/025* (2013.01); *H02J 50/10* (2016.02); *H02J 50/40* (2016.02); *H02J 50/70* (2016.02); *H02J 50/90* (2016.02); *H02J 7/0027* (2013.01); *H02J 7/0045* (2013.01)

(58) Field of Classification Search
  USPC .................................. 307/104; 320/108, 109
  See application file for complete search history.

(56) References Cited

U.S. PATENT DOCUMENTS

| | | | |
|---|---|---|---|
| 2012/0194125 A1 | 8/2012 | Kanasugi et al. | |
| 2012/0223595 A1* | 9/2012 | Oodachi | H02J 5/005 307/104 |
| 2014/0029233 A1 | 1/2014 | Yanagida et al. | |
| 2014/0125271 A1* | 5/2014 | Wang | H02J 7/0027 320/107 |
| 2015/0244181 A1 | 8/2015 | Kagami et al. | |
| 2015/0326060 A1* | 11/2015 | Young | H02J 7/0077 320/108 |

FOREIGN PATENT DOCUMENTS

| | | |
|---|---|---|
| JP | 2004-007851 | 1/2004 |
| JP | 2014-088092 | 5/2014 |
| JP | 2014-233111 | 12/2014 |
| JP | 2016-005393 | 1/2016 |
| WO | 2015/037690 | 3/2015 |
| WO | 2016/043135 | 3/2016 |

OTHER PUBLICATIONS

Japanese Office Action for Japanese Patent Application No. 2016-090100 dated Feb. 18, 2020.

* cited by examiner

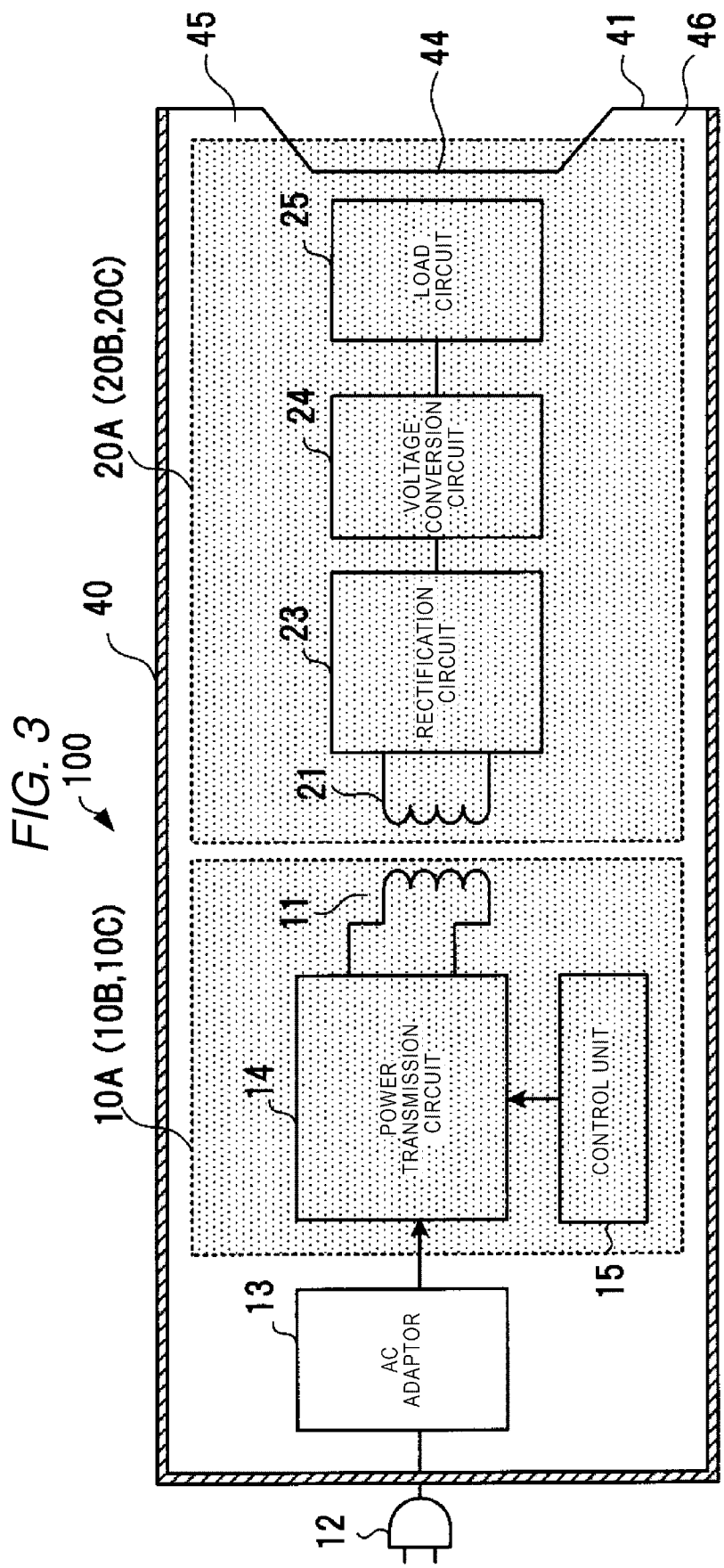

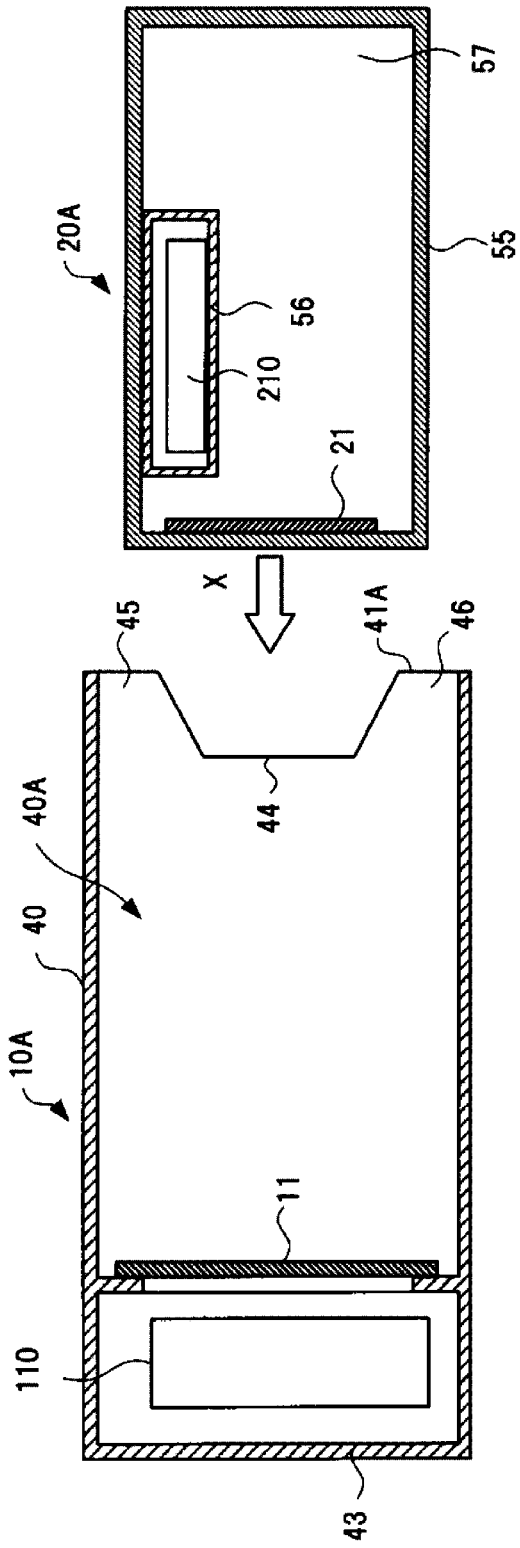
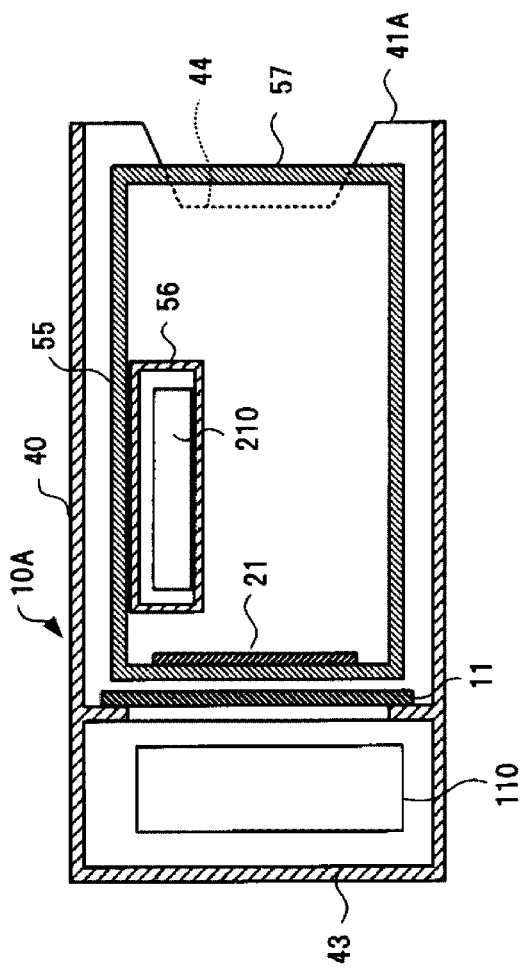

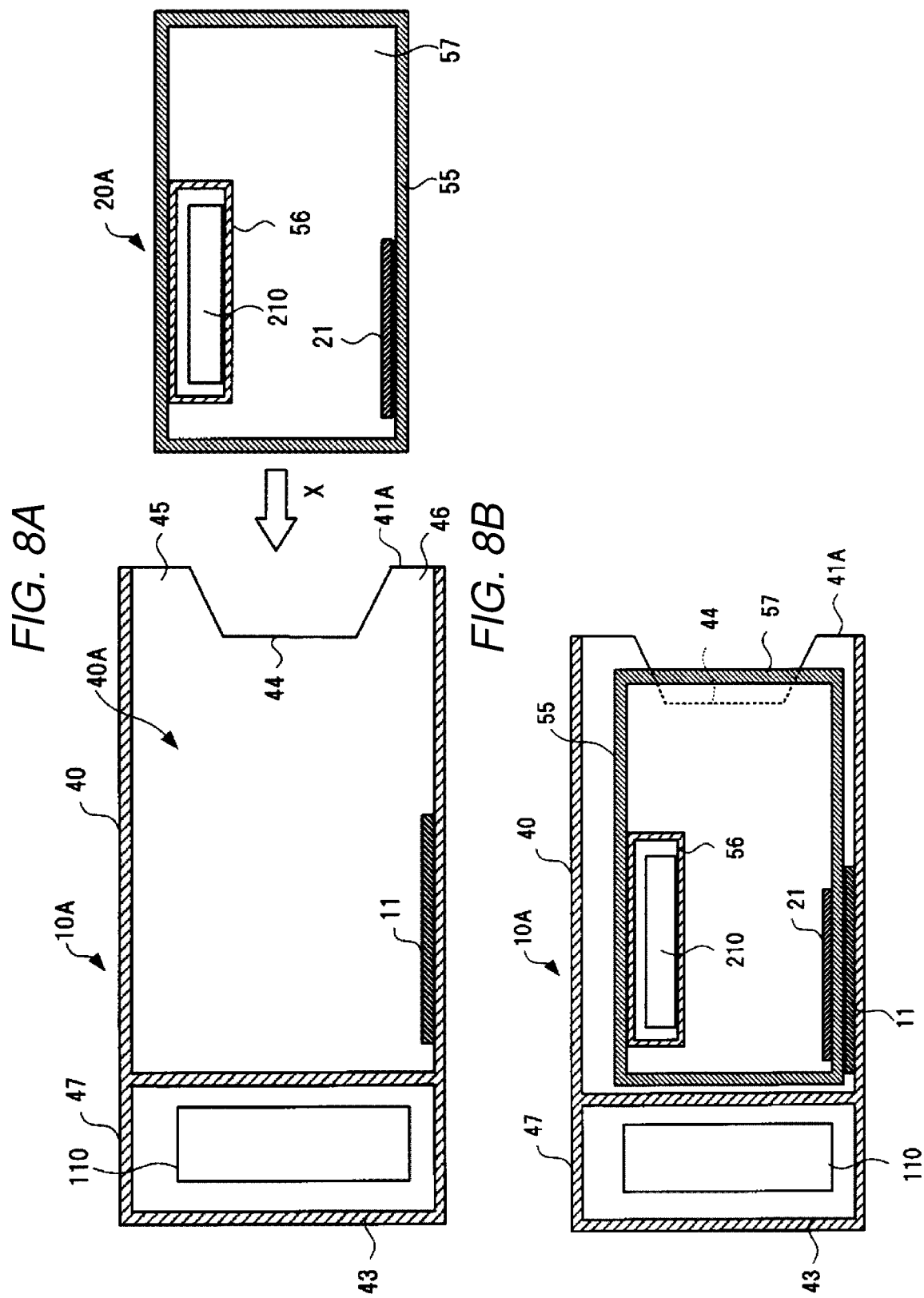

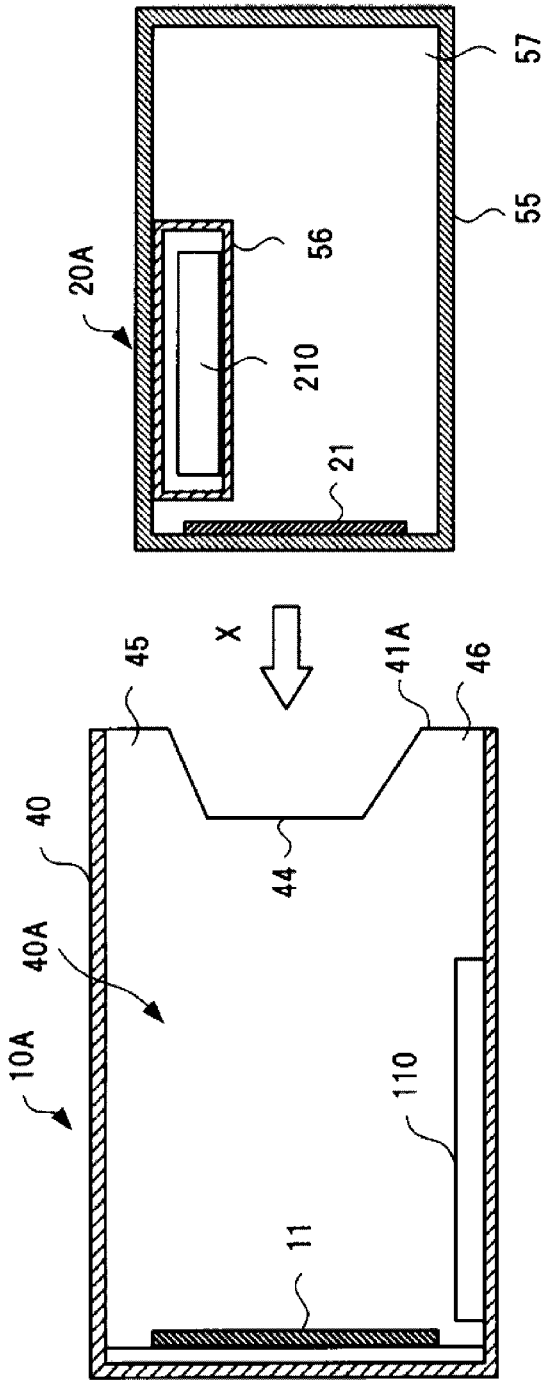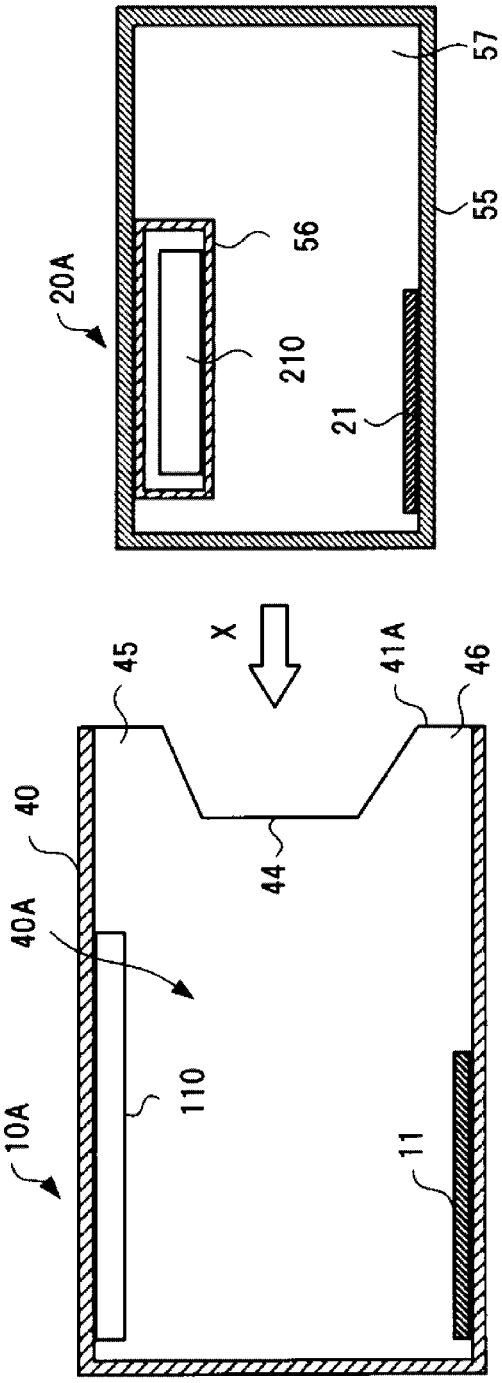

CONTACTLESS POWER TRANSMISSION DEVICE AND CONTACTLESS POWER TRANSMISSION/RECEPTION APPARATUS

CROSS-REFERENCE TO RELATED APPLICATION

This application is based upon and claims the benefit of priority from Japanese Patent Application No. P2016-090100, filed Apr. 28, 2016, the entire contents of which are incorporated herein by reference.

FIELD

Embodiments described herein relate generally to a power transmission device which transmits power to a power reception device in a contactless manner, and a power transmission/reception apparatus which transmits and receives power in a contactless manner.

BACKGROUND

In recent years, power transmission devices, which transmit power in a contactless manner, spread. A contactless power transmission device is an apparatus which transmits power to a power reception device such as a portable terminal or a tablet terminal by using electromagnetic coupling such as electromagnetic induction or magnetic field resonance. The contactless power transmission device includes a power transmission circuit and a power transmission coil for transmitting power, and the power reception device includes a power reception coil for receiving power, a power reception circuit for using the received power for the drive of own device, a charging circuit for charging a secondary battery mounted in own device, and the like.

In the contactless power transmission device, it is required to suppress radiation noise to be low while power is transmitted to the power reception device with a high efficiency. Therefore, as the power transmission circuit of the contactless power transmission device, an amplifier in which switching loss is reduced by zero voltage switching (ZVS) and which uses resonance, such as an E-class amplifier is often used. The ZVS allows switching of switching elements such as a MOSFET in a zero-voltage state, is called soft switching, and has effects of reducing switching loss and implementing a highly efficient power transmission circuit.

Compared to hard switching which is a normal switching method, soft switching has advantages that the rising of a voltage or a current becomes gentle and the generation of noise is reduced. However, even in the soft switching, the generation of noise due to the switching of switching elements such as MOSFET cannot be avoided, and therefore, in the contactless power transmission device, the switching noise is a major noise source.

Meanwhile, in the power reception device, in order to convert AC power which is received by the power reception coil, to DC power, a rectification circuit such as a full-wave rectification circuit is generally connected to the rear stage of the power reception coil. A full-wave rectification circuit in which four rectifier diodes are used and are connected in a bridge type is usually used, but noise which is generated due to rectification of the diodes is great. In addition, it is known that the generation of noise is reduced when using the Schottky barrier diode with a high speed instead of using a general diode. However, even when using the Schottky barrier diode, there is no change in that the diode is the noise source.

The power transmission coil for radiating power is connected to the power transmission circuit, the power reception coil for receiving power is connected to the power reception circuit, and each coil functions as an antenna. Therefore, if there is a noise source in the power transmission circuit and the power reception circuit, there is a problem in that the power transmission coil or the power reception coil functions as an antenna so as to radiate the noise. In order to realize low-noise by solving such a problem, techniques regarding shielding (for example, JP-A-2010-070048, and JP-A-2012-228150) are disclosed.

However, in the technique described in JP-A-2010-070048, since a shield box is just provided to the power transmission coil and the power reception coil, there is a problem in that shielding effects with respect to an electromagnetic field leaking from a transmission path between the power transmission coil and the power reception coil are low, and radiation noise cannot be sufficiently reduced. In the technique described in JP-A-2012-228150, in order to provide not only shields of a power transmission section and a power reception section, but also a large-sized shield for covering the outer side of the shields, there is a problem in that the shield structure is complicated and is increased in size.

DESCRIPTION OF THE DRAWINGS

FIG. 3 is a configuration diagram schematically illustrating a contactless power transmission device according to the embodiment.

FIGS. 7A and 7B are sectional views illustrating examples of the power transmission device and the power reception device according to the embodiment.

FIGS. 8A and 8B are sectional views illustrating other examples of the power transmission device and the power reception device according to the embodiment.

FIGS. 9A and 9B are sectional views illustrating still other examples of the power transmission device and the power reception device according to the embodiment.

DETAILED DESCRIPTION

Figure 1:
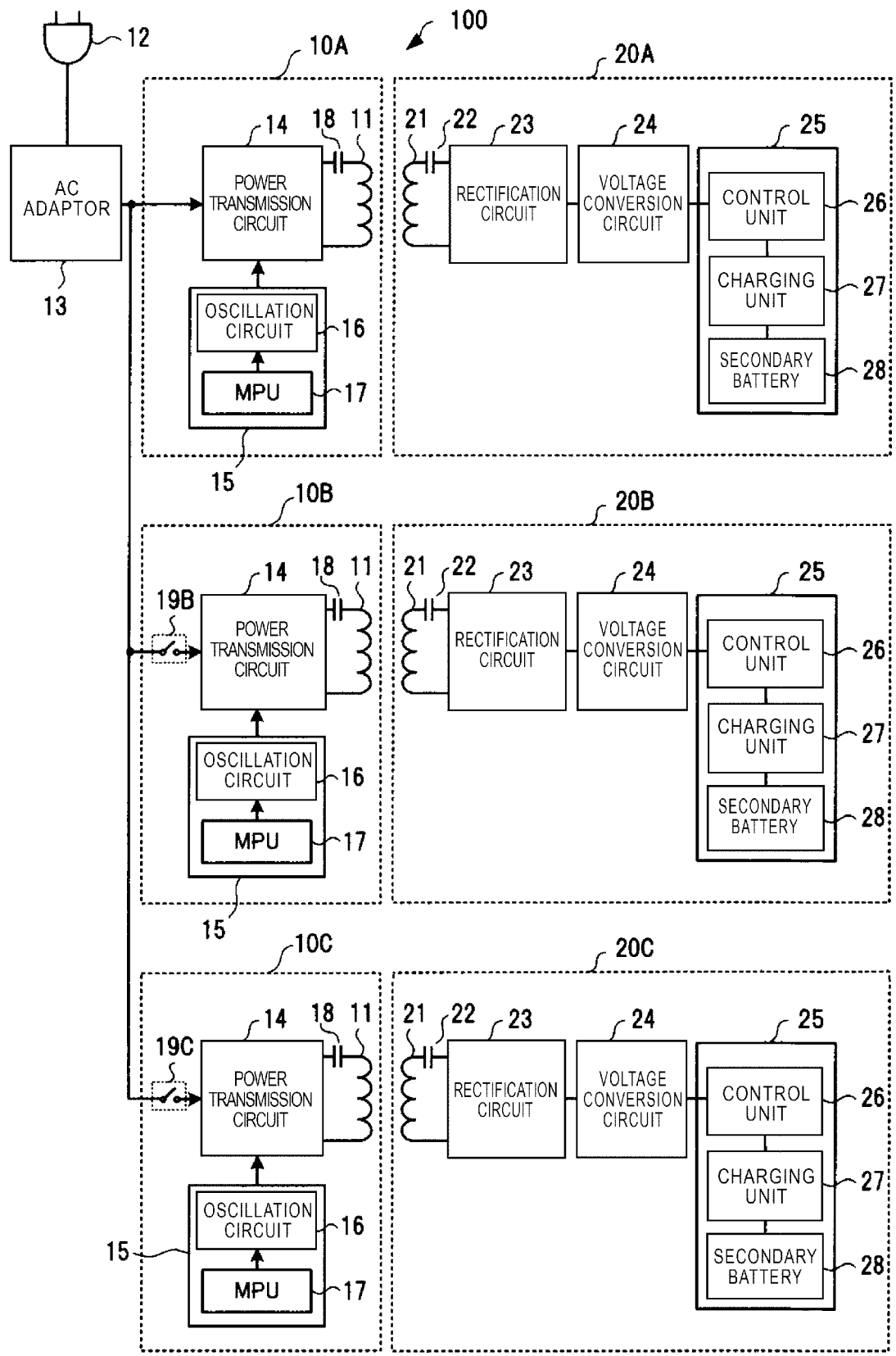
FIG. 1 is a block diagram illustrating a contactless power transmission/reception apparatus according to an embodiment.

An object of the exemplary embodiment is to provide a contactless power transmission device and a contactless power transmission/reception apparatus which have a shield structure in which noise can be sufficiently reduced and a power reception device can be easily extracted and inserted into the contactless power transmission device including a plurality of power transmission devices.

According to an embodiment, there is provided a contactless power transmission device which transmits power to a power reception device in a contactless manner, and includes a shield case which has an opening portion at one end portion thereof, and is partitioned into a plurality of shield rooms by partitioning plates; a power transmission circuit which is for transmitting power and is disposed to correspond to each of the plurality of shield rooms; a plurality of power transmission coils which are disposed on the inner side in the plurality of shield rooms when viewed from the opening portion, and transmit AC power from the power transmission circuit to the power reception device; and a notch which is formed on side surfaces of the shield case or the partitioning plates, from the opening portion toward the inner side such that both sides of a rear end portion of the power reception device inserted into the plurality of shield rooms can be held.

Hereinafter, embodiments are described by referring to the drawings. The same reference numerals are given to the same elements in each drawing.

First Embodiment

FIG. 1 is a block diagram illustrating a contactless power transmission/reception apparatus 100 according to the embodiment. The contactless power transmission/reception apparatus 100 includes a plurality of power transmission devices 10A to 10C which transmit power, and a plurality of power reception devices 20A to 20C which receive the transmitted power in a contactless manner.

In FIG. 1, three power transmission devices 10A to 10C and three power reception devices 20A to 20C are illustrated, but the power transmission device may be provided by two or more. In addition, it is not necessary that the power reception device is provided by the same number as the power transmission device, and may be provided by one or plural. For example, in a case where three power transmission devices are provided, it is possible to transmit power to three power reception devices at one time.

Since the plurality of power transmission devices 10A to 10C have the same circuit configuration, the same reference numeral is given to the same circuit part of the power transmission devices 10A, 10B, and 10C. In addition, since the plurality of power reception devices 20A to 20C have the same circuit configuration, the same reference numeral is given to the same circuit part of the power reception devices 20A, 20B, and 20C.

The power transmission device 10A includes a power transmission coil 11, and the power reception device 20A includes a power reception coil 21. Power output from the power transmission device 10A is transmitted to the power reception device 20A by using electromagnetic coupling such as electromagnetic induction or magnetic field resonance between the power transmission coil 11 and the power reception coil 21.

DC power is supplied to the power transmission device 10A from an AC adaptor 13 which converts AC 100 V input from the plug 12 to a DC voltage. The power transmission device 10A includes a power transmission circuit 14 which generates transmission power required for the power transmission, and a control unit 15 which controls the power transmission circuit 14. The control unit 15 includes an oscillation circuit 16 and a microprocessor unit (MPU) 17. The oscillation circuit 16 supplies frequencies of power carrier waves to the power transmission circuit 14. The MPU 17 performs a drive control which causes the power transmission circuit 14 to be operated or stopped according to the necessity, a communication control with respect to the power reception device 20A, and the like.

As the power transmission circuit 14, an amplifier circuit by a switching circuit in which the efficiency is considered to be important, for example, a D-class amplifier circuit or an E-class amplifier circuit is used. As the switching element, a MOS-FET is generally used. The power transmission circuit 14 performs soft switching by zero voltage switching (ZVS) or zero current switching (ZCS). By performing soft switching, switching loss is reduced, and switching noise and radiation noise can be reduced.

As the oscillating frequency of the oscillation circuit 16, that is, the switching frequency of the power transmission circuit 14, for example, a frequency of 6.78 MHz is used. The output of the power transmission circuit 14 is supplied to the power transmission coil 11 through a resonance capacitor 18, and power of power transmission frequency of 6.78 MHz is transmitted from the power transmission coil 11. The power transmission frequency of 6.78 MHz is described as an example, but the power transmission frequency is not limited to 6.78 MHz, and may be other frequencies.

The power transmission devices 10B and 10C have the same circuit configuration as the power transmission device 10A, and DC power is supplied from the AC adaptor 13 to the power transmission devices 10B and 10C. In addition, switches 19B and 19C may be respectively provided between the AC adaptor 13 and the power transmission device 10B, and between the AC adaptor 13 and the power transmission device 10C. By providing the switches 19B and 19C, it is possible to supply DC power to the power transmission devices 10B and 10C as necessary, and thus if there is no need to operate the power transmission devices 10B and 10C, the switches 19B and 19C may be turned off.

The power reception device 20A includes a resonance circuit configured of the power reception coil 21 and a resonance capacitor 22, a rectification circuit 23, a voltage conversion circuit 24, and a load circuit 25. AC power transmitted through the resonance circuit configured of the power reception coil 21 and the resonance capacitor 22 is converted to a DC voltage by the rectification circuit 23 (for example, a diode full-wave rectification circuit). The converted DC voltage is converted, by the voltage conversion circuit 24, to a proper voltage by which the load circuit 25 can be operated. In this manner, the resonance capacitor 22, the rectification circuit 23, and the voltage conversion circuit 24 configure a power reception circuit which converts AC power received by the power reception coil to DC power.

The load circuit 25, for example, is a circuit of electronic equipment such as a portable terminal or a tablet terminal, and includes a control unit 26, a charging unit 27 and a secondary battery 28. Power received by the power reception device 20 is used for charging the secondary battery 28 built in the electronic equipment, or the like. The control unit 26 is configured of a microcomputer including a CPU, and controls the charging unit 27 so that the charging of the secondary battery 28 is appropriately controlled. In addition, the control unit 26 controls the communication with respect to the power transmission device 10A.

The power reception devices 20B and 20C have the same circuit configuration as the power reception device 20A. Power output from the power transmission devices 10B and 10C is transmitted to the power reception devices 20B and 20C by using electromagnetic coupling such as electromagnetic induction or magnetic field resonance between the corresponding power transmission coil 11 and the corresponding power reception coil 21.

The switching element such as a MOS-FET used in the power transmission circuit 14 of each of the power transmission devices 10A to 10C performs switching at a high frequency of 6.78 MHz, and thus generates a frequency of 6.78 MHz and harmonic frequencies of 6.78 MHz. By providing a low pass filter to an output port of the power transmission circuit 14, noise can be reduced, but the noise which is not sufficiently reduced is radiated from the power transmission coil 11, or a cable which connects the plug 12 to the AC adaptor 13.

In the power reception devices 20A to 20C, the rectification circuit 23 of each of the power reception devices 20A to 20C is the major noise source. As the rectification circuit 23, for example, a bridge-type full-wave rectification circuit as illustrated in FIG. 2A or a half-wave rectification circuit as illustrated in FIG. 2B is used.

Figure 2A:
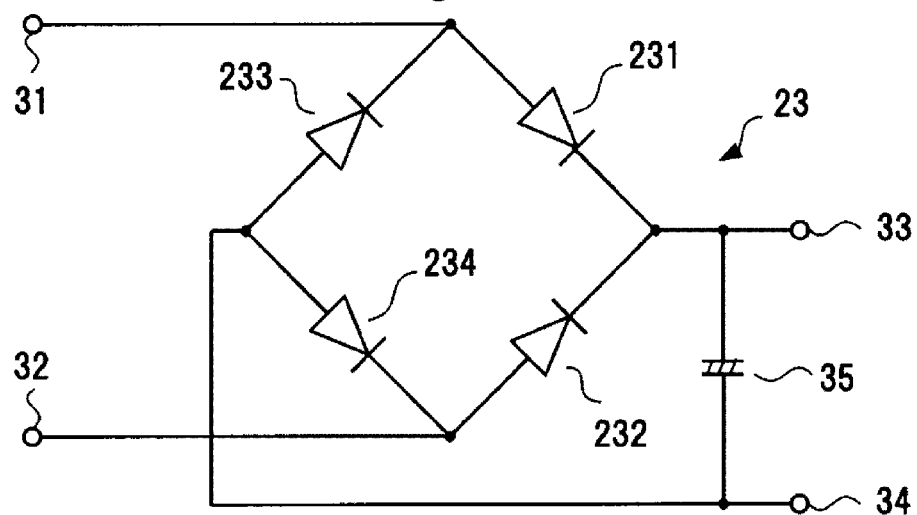
FIGS. 2A and 2B are circuit diagrams illustrating examples of a rectification circuit used in the embodiment.

In the full-wave rectification circuit 23 in FIG. 2A is configured of diodes 231 to 234, the anode of the diode 231 and the cathode of the diode 233 are connected to one input port 31 of the full-wave rectification circuit 23, the anode of the diode 232 and the cathode of the diode 234 are connected to the other input port 32. In addition, cathodes of the diode 231 and the diode 232 are connected to an output port 33, and anodes of the diode 233 and the diode 234 are connected to a reference potential port 34 (earth port). In addition, a smoothing capacitor 35 is connected between the output port 33 and the reference potential port 34 (earth port), and a DC voltage is obtained from both ends of the smoothing capacitor 35.

Figure 2B:
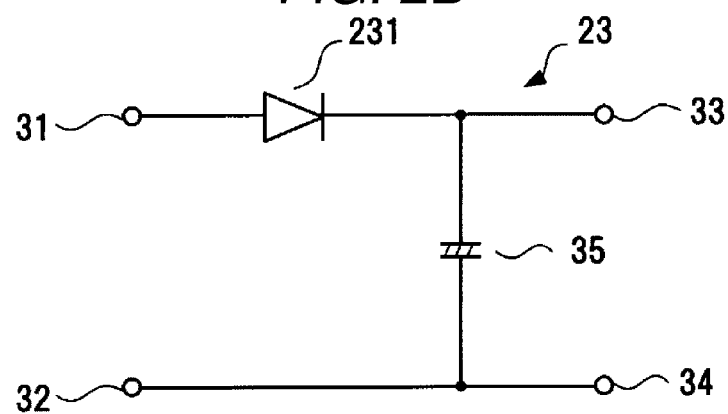

In the half-wave rectification circuit 23 in FIG. 2B, the anode of the diode 231 is connected to the input port 31, and the cathode of the diode 231 is connected to the output port 33. The smoothing capacitor 35 is connected between the output port 33 and the reference potential port 34 (earth), and a DC voltage is obtained from both ends of the smoothing capacitor 35.

As the diode for the rectification of a high frequency as 6.78 MHz, the Schottky barrier diode in which the forward voltage drop is small is used, and thus it is possible to improve the rectifying efficiency. In addition, as the smoothing capacitor 35 connected to the output port 33 of the rectification circuit 23, an electrolytic capacitor or a ceramic capacitor is used.

In some cases, the noise accompanied by the rectification of the diode may not be removed by the smoothing capacitor 35 only. Therefore, by connecting the low pass filter to the rear stage of the rectification circuit 23, it is possible to reduce noise. Even in such a case, noise is transferred to the power reception coil 21 connected to the input port 31, and is radiated from the power reception coil 21.

The noise radiated from the contactless power transmission device necessarily satisfies a regulation value stipulated by the Radio Act of each country. In case of Japan, the regulation value of the radiation noise is stipulated by the Radio Act. In addition, if 6.78 MHz as the industry-science-medical (ISM) frequency is used as the power transmission frequency, the restriction target is under the CISPR 11 as the International Standards and the FCC Part 18 in USA. In addition to the noise radiated to the space, noise conducting the power supply line is also regulated.

However, in case of relatively small equipment such as a portable terminal or portable equipment, if the power transmission device and power reception device are input in the shield box and are electromagnetically sealed such that electromagnetic waves do not leak, the fact that the radiation noise can significantly be reduced is generally known.

For example, a case in which the entirety of small equipment such as a portable terminal or portable equipment is input in the shield box, and a shielding door is provided to the shield box may be considered, but in this case, it is necessary to open and close the door of the shield box for extracting and inserting the equipment, which becomes complicated. In addition, the shield device itself is increased in size.

A case in which a shielding door is not provided, the depth of the shield box is lengthened, and the power reception device (portable terminal or portable equipment) is accommodated in the shield box sufficiently is also considered. However, in a case where the power reception device is accommodated in the shield case of which the depth is lengthened, the effect of reducing radiation noise is improved, but there is a problem that it is difficult to extract the power reception device from the shield case.

In the embodiment, the contactless power transmission device is provided in which the power transmission devices 10A to 10C and the power reception devices 20A to 20C are covered by a case (shield case) having shielding effects, the power reception devices 20A to 20C can be extracted through the opening portion of the shield case, the opening area of the shield case is reduced as much as possible, and thus the power reception devices 20A to 20C are easily extracted and inserted.

FIG. 3 is a configuration diagram schematically illustrating the contactless power transmission device according to the embodiment. In the example of FIG. 3, the power transmission device 10A including the power transmission coil 11 is provided in a shield case 40. Since the power transmission devices 10B and 10C also have the same configuration as the power transmission device 10A, the power transmission device 10A is representatively described.

The shield case 40 includes an opening portion 41 at one end portion thereof, and the power reception device 20A can be accommodated in the shield case 40 through the opening portion 41. In FIG. 3, a case in which the AC adaptor 13 is included in the power transmission device 10 is illustrated, but the AC adaptor 13 can be configured as a separate circuit component. In addition, a configuration in which only the AC adaptor 13 is provided to the outside of the shield case 40 may be adopted.

The power transmission coil 11 is attached to the inner side of the shield case 40 when viewed from the opening portion 41. In the power reception device 20A, the power reception coil 21 is disposed at a position facing the power transmission coil 11, and when the power reception device 20A is accommodated in the shield case 40, the power transmission coil 11 and the power reception coil 21 become close to each other so that power can be transmitted.

The size of the inner circumference of the shield case 40 is set to be slightly greater than that of the outer circumference of the power reception device 20A such that the efficiency of transmitting power does not deteriorate due to the deviation in the position, at which the power transmission coil 11 and the power reception coil 21 face each other, being increased. For example, the gap between the outer circumference of the power reception device 20A and the inner circumference of the shield case 40 is within about 2 to 3 cm, and thus even if the position of the power reception device 20A is deviated in the shield case 40, the deviation is minimized.

The power transmission coil 11 is provided in the shield case 40, but the circuit part configuring the power transmission device 10A except for the power transmission coil 11 may be disposed in the same shield case 40, and may be integrally disposed to the outside of the shield case 40 so as to correspond to the shield case 40. In case of being disposed to the outside of the shield case 40, a countermeasure for noise such as inserting the circuit part into a shield case separate from the shield case 40, is necessary so that noise is not radiated.

Figure 4:
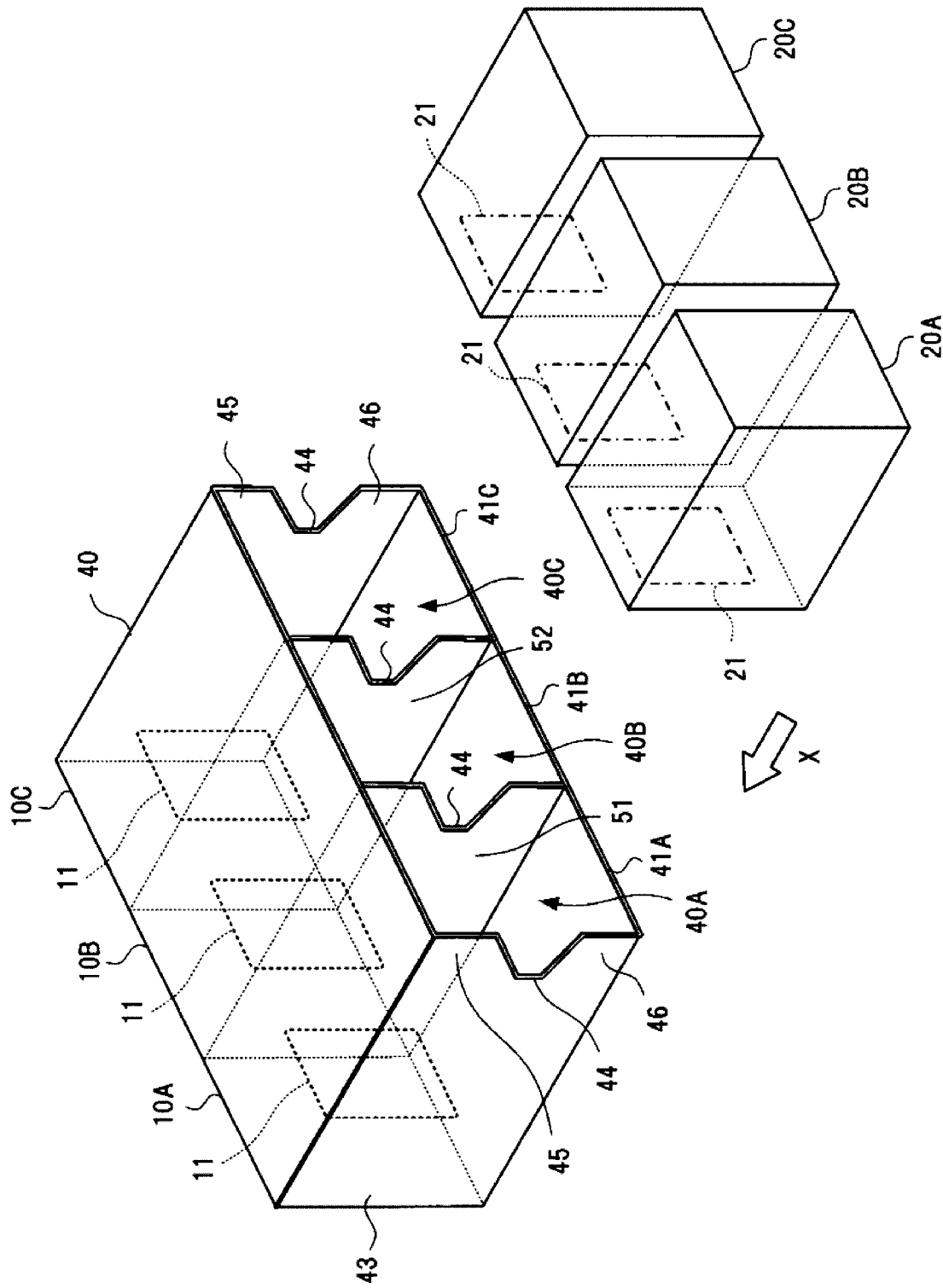
FIG. 4 is a perspective view illustrating a power transmission device and a power reception device according to the embodiment.

FIG. 4 is a perspective view illustrating the power transmission devices 10A to 10C and the power reception devices 20A to 20C of the embodiment. The power transmission devices 10A, 10B, and 10C are configured to be in the shield case 40. The shield case 40 has a box shape, and is partitioned into three shield rooms 40A, 40B, and 40C by partitioning plates 51 and 52. The partitioning plates 51 and 52 are configured of metal or conductive members which have shielding effects similar to the shield case 40, and the shield rooms 40A, 40B, and 40C which are plurally partitioned by these partitioning plates 51 and 52 are formed.

The power reception devices 20A, 20B, and 20C can be respectively extracted from and inserted into the shield rooms 40A, 40B, and 40C through the opening portions 41A, 41B, and 41C. In addition, the power transmission device 10A is described as an example, if an insertion direction of the power reception device 20A is set as an arrow X direction, the power transmission coil 11 is attached to the inner side of the shield room 40A which faces the opening portion 41A, in a direction orthogonal to the insertion direction X (vertically). The power transmission coil 11 may be formed on a printed circuit board or formed by wirings. In addition, the circuit part of the power transmission device 10A except for the power transmission coil 11 may be disposed between the power transmission coil 11 and an inner-side end surface 43 of the shield room 40A.

In the power reception device 20A, the power reception coil 21 is disposed at a position facing the power transmission coil 11. If the power reception device 20A is inserted into the shield room 40A in a depth direction through the opening portion 41A, and is inserted up to a position where the power reception device bumps into the power transmission coil 11, the power transmission coil 11 and the power reception coil 21 face each other at a close range within 2 to 3 cm, and power can be transmitted in a contactless manner.

Notches 44 are formed on both side surfaces of the shield case 40, from the opening portions 41A and 41C toward the inner side, and similarly, the notches 44 are formed on the partitioning plates 51 and 52. That is, the notches 44 are almost formed at the central portion of both sides of the power reception device 20A in the insertion direction X, that is, both side surfaces of the shield room 40A except for the bottom surface portion and the ceiling portion.

Accordingly, in a case where the power reception devices 20A, 20B, and 20C which are respectively inserted into the shield rooms 40A, 40B, and 40C are extracted, due to the notches 44 being provided, the power reception devices 20A, 20B, and 20C are easily extracted. For example, when the power reception device 20A is accommodated in the shield room 40A, the front end portion of the power reception device 20A in the insertion direction faces the power transmission coil 11. Meanwhile, the rear end portion of the power reception device 20A in the insertion direction is positioned further on the inner side than the opening portion 41A, but a part of the rear end portion is exposed through the notch 44.

Figure 5:
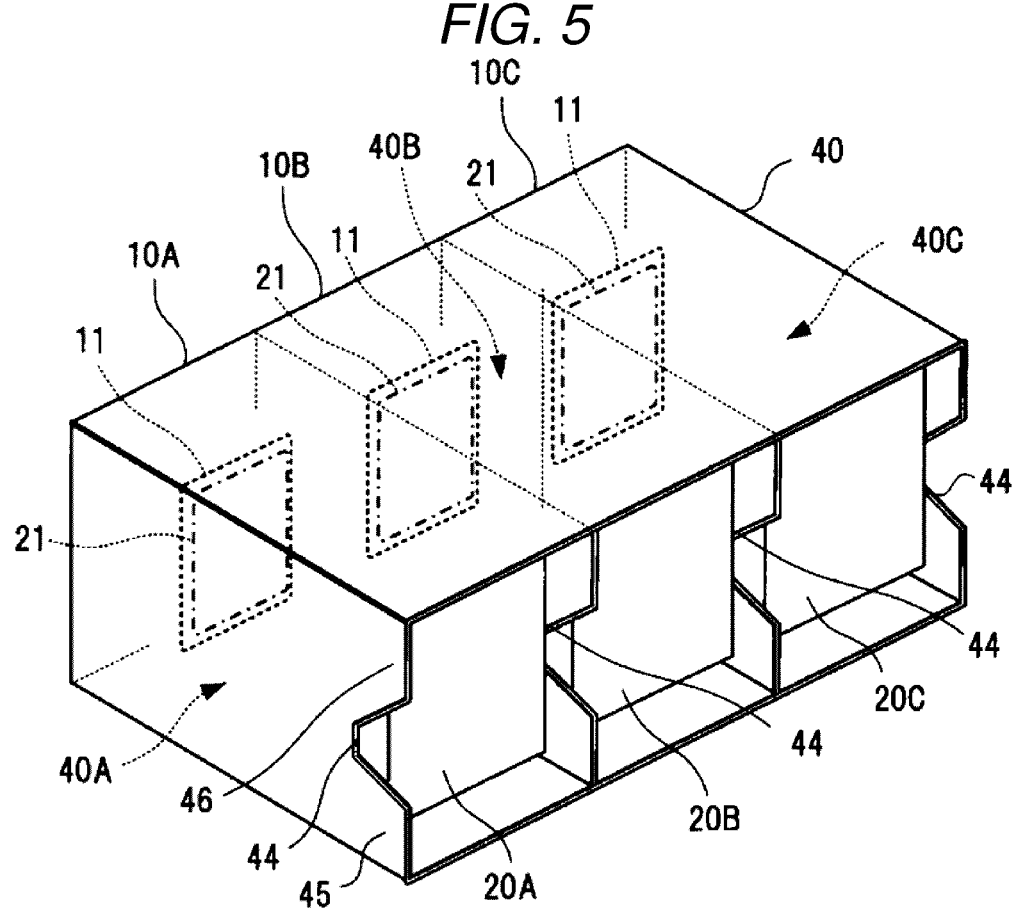
FIG. 5 is a perspective view illustrating a state in which the power reception device is accommodated in a shield case according to the embodiment.

FIG. 5 is a perspective view schematically illustrating a state in which the power reception devices 20A, 20B, and 20C are accommodated in the shield rooms 40A, 40B, and 40C. As illustrated in FIG. 5, if the power reception devices 20A, 20B, and 20C are inserted into the shield rooms 40A, 40B, and 40C, and pushed up to a position where the power reception devices bump into the power transmission coils 11, the power reception coil 21 and the power transmission coil 11 closely face each other. Accordingly, power can be transmitted from the power transmission device 10A to the power reception device 20A in a contactless manner.

Similarly, power can be transmitted from the power transmission device 10B to the power reception device 20B, and from the power transmission device 10C to the power reception device 20C in a contactless manner. In addition, in this state, the rear end portions of the power reception devices 20A, 20B, and 20C are positioned further on the inner side than the opening portions 41A, 41B, and 41C, but a part of each rear end portion is exposed through the notch 44.

Accordingly, when the power reception devices 20A, 20B, and 20C are extracted from the shield rooms 40A, 40B, and 40C, if the power reception devices 20A, 20B, and 20C are extracted by the rear end portions thereof being held by fingers from both sides of the notch 44, the power reception devices 20A, 20B, and 20C can be easily extracted.

Since the notches 44 are almost formed at the central portion of the both side surfaces of the shield case 40 and the partitioning plates 51 and 52, protrusions 45 and 46 are generated on the upper side and the lower side of the notch 44. Therefore, the most parts of the rear end portions of the power reception devices 20A, 20B, and 20C are accommodated in the shield rooms 40A, 40B, and 40C, and thus electromagnetic waves radiated through the opening portions 41A, 41B, and 41C can be reduced. Actually, it was confirmed through experiments that if the protrusions 45 and 46 are not provided, the noise level is increased by several dB to 10 dB or more.

Figure 6A:
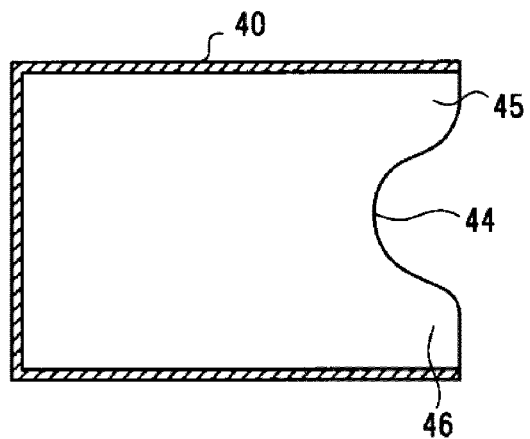
FIGS. 6A and 6B are sectional views illustrating modification examples of the shield case according to the embodiment.
Figure 6B:
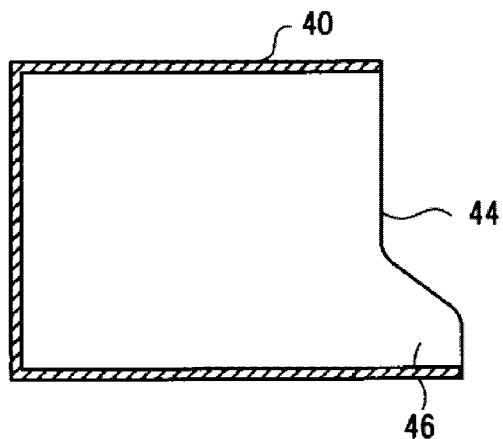

FIGS. 6A and 6B are sectional views each illustrating another shape of the notch 44 formed on the shield case 40 and the partitioning plates 51 and 52. That is, in the examples of FIGS. 4 and 5, the notch 44 has a linear shape (trapezoidal shape), but the notch 44 may be formed in a curved shape such as a semicircular shape as illustrated in FIG. 6A.

Further, another shape of the notch 44 formed on the shield case 40 and the partitioning plates 51 and 52, as illustrated in FIG. 6B, one of the protrusions 45 and 46 is provided and the other one is not provided. In FIG. 6B, the protrusion 46 is only provided, and thus the notch 44 is formed from the central portion to the other end portion.

As illustrated in FIG. 6B, since the upper side protrusion 45 is not provided, the power reception device 20 can be further easily extracted and inserted. However, in this case, since the level of radiation noise is slightly increased compared to a case where the protrusions 45 and 46 are provided on both end portions, if there is margin for the regulation value of the noise, the above-described example can be adopted.

FIGS. 7A and 7B are sectional views illustrating examples of the power transmission device 10A provided in the shield room 40A, and the power reception device 20A. FIG. 7A illustrates a state in which the power reception device 20A is separated from the shield room 40A, and FIG. 7B illustrates a state in which the power reception device 20A is accommodated in the shield room 40A.

As illustrated in FIG. 7A, the shield room 40A has a box shape, and the power reception device 20A can be extracted and inserted through the opening portion 41A. The power transmission coil 11 is attached to the inner side of the shield room 40A which faces the opening portion 41A, in a direction orthogonal to the insertion direction X (vertically). In this case, the power transmission coil 11 is a printed coil formed on the printed circuit board.

A circuit part 110 of the power transmission device 10A except for the power transmission coil 11 is disposed on the outer side of the power transmission coil 11, that is, between the power transmission coil 11 and the inner-side end surface 43 of the shield room 40A. The notch 44 is formed on the side surfaces of the shield room 40A, from the edges of the opening portion 41A toward the inner side.

The power reception device 20A includes a housing 55 of a shape so as to be accommodated in the shield room 40A, and the power reception coil 21 is attached to a surface in the housing 55 which faces the power transmission coil 11. A power reception circuit 210 such as the rectification circuit 23 of the power reception device 20A except for the power reception coil 21 is disposed in a shield case 56 provided in the housing 55. The shield case 56 and the power reception circuit 210 are provided on the ceiling portion or the bottom surface portion of the housing 55. FIGS. 7A and 7B illustrate a case where those are provided on the ceiling portion.

As illustrated in FIG. 7B, if the power reception device 20A is inserted into the shield room 40A through the opening portion 41A, and is accommodated up to a position where the power reception device bumps into the power transmission coil 11, the power transmission coil 11 and the power reception coil 21 face each other at a close range within 2 to 3 cm, and power can be transmitted in a contactless manner.

In addition, when the power reception device 20A is accommodated in the shield room 40A, a rear end portion 57 of the power reception device 20A (the housing 55) is positioned further on the inner side than the opening portion 41A, and the rear end portion 57 is exposed through the notch 44. Accordingly, when the power reception device 20A is extracted from the shield room 40A, if the power reception device 20A is extracted by the rear end portion 57 being held by fingers from both sides of the notch 44, the power reception device 20A can be easily extracted.

In FIGS. 7A and 7B, a case in which the power transmission coil 11 is provided to be along the inner-side surface of the shield room 40A is described, but the power transmission coil 11 may be provided to be along another surface in the shield room 40A, for example, the bottom surface portion, the ceiling portion, or the side surface portion. In addition, the power transmission coil may be provided on two or more surfaces.

FIGS. 8A and 8B are sectional views illustrating other examples of the power transmission device 10A provided in the shield room 40A, and the power reception device 20A. FIG. 8A illustrates a state in which the power reception device 20A is separated from the shield room 40A, and FIG. 8B illustrates a state in which the power reception device 20A is accommodated in the shield room 40A.

The main difference point from FIGS. 7A and 7B is that, as illustrated in FIG. 8A, the power transmission coil 11 is attached to the bottom surface portion on the inner side of the shield room 40A when viewed from the opening portion 41A, to be parallel with the insertion direction X of the power reception device 20A. In addition, a separate shield case 47 is integrally provided to the outer side of the shield room 40A, and the circuit part 110 of the power transmission device 10A except for the power transmission coil 11 is disposed in the shield case 47. That is, the circuit part except for the power transmission coil 11 is disposed to correspond to the shield room 40A.

In the power reception device 20A, the power reception coil 21 is attached to a position (bottom surface) in the housing 55 which faces the power transmission coil 11. The power reception circuit 210 such as the rectification circuit 23 of the power reception device 20A except for the power reception coil 21 is disposed in the shield case 56 provided in the housing 55, and the shield case 56 and the power reception circuit 210 are provided on the ceiling portion or the bottom surface portion of the housing 55.

As illustrated in FIG. 8B, if the power reception device 20A is inserted into the shield room 40A through the opening portion 41A up to the bumping position, the power transmission coil 11 and the power reception coil 21 face each other at a close range within 2 to 3 cm, and power can be transmitted in a contactless manner.

In addition, when the power reception device 20A is accommodated in the shield room 40A, a part of the rear end portion 57 is exposed through the notch 44. Accordingly, when the power reception device 20A is extracted from the shield room 40A, if the power reception device 20A is extracted by the rear end portion 57 being held by fingers from both sides of the notch 44, the power reception device 20A can be easily extracted.

FIGS. 9A and 9B are sectional views illustrating other examples of the power transmission device 10A provided in the shield room 40A, and the power reception device 20A. FIGS. 9A and 9B illustrate a state in which the power reception device 20A is separated from the shield room 40A.

In the example of FIG. 9A, the power transmission coil 11 is attached to the inner side of the shield room 40A which faces the opening portion 41A, in a direction orthogonal to the insertion direction X (vertically). In addition, the circuit part 110 of the power transmission device 10A except for the power transmission coil 11 is disposed on the bottom surface portion on the inner side of the shield room 40A.

In the power reception device 20A, the power reception coil 21 is attached to a surface in the housing 55 which faces the power transmission coil 11. The power reception circuit 210 such as the rectification circuit 23 of the power reception device 20A except for the power reception coil 21 is disposed in the shield case 56 provided in the housing 55, and the shield case 56 and the power reception circuit 210 are provided on the ceiling portion or the bottom surface portion of the housing 55.

If the power reception device 20A is inserted into the shield room 40A through the opening portion 41A up to the bumping position, the power transmission coil 11 and the power reception coil 21 face each other at a close range within 2 to 3 cm, and power can be transmitted in a contactless manner. In addition, when the power reception device 20A is accommodated in the shield room 40A, a part of the rear end portion 57 is exposed through the notch 44.

In the example of FIG. 9B, the power transmission coil 11 is attached to the bottom surface portion on the inner side of the shield room 40A which faces the opening portion 41A, to be parallel with the insertion direction X (horizontally). In addition, the circuit part 110 of the power transmission device 10A except for the power transmission coil 11 is disposed on the ceiling portion on the inner side of the shield room 40A which faces the opening portion 41A.

In the power reception device 20A, the power reception coil 21 is attached to the bottom surface portion in the housing 55 which face the power transmission coil 11. The power reception circuit 210 such as the rectification circuit 23 of the power reception device 20A except for the power reception coil 21 is disposed in the shield case 56 provided in the housing 55, and the shield case 56 and the power reception circuit 210 are provided on the ceiling portion or the bottom surface portion of the housing 55.

If the power reception device 20A is inserted into the shield room 40A through the opening portion 41A up to the bumping position, the power transmission coil 11 and the power reception coil 21 face each other at a close range within 2 to 3 cm, and power can be transmitted in a contactless manner. In addition, when the power reception device 20A is accommodated in the shield room 40A, a part of the rear end portion 57 of the power reception device 20A is exposed through the notch 44.

In FIGS. 9A and 9B, since the circuit part 110 is provided on the bottom surface portion or the ceiling portion of the shield case 40, a guide member which guides the power reception device 20A into the shield room 40A may be provided such that when the power reception device 20A is inserted into the shield room 40A, the power reception device 20A does not collide with the circuit part 110. It is preferable that the size of the inner circumference of the shield room 40A is slightly greater than the outer circumference of the power reception device 20A in consideration that the circuit part 110 is equipped in the shield room.

In FIGS. 7A to 9B, the configurations of the power transmission device 10A and the power reception device 20A are representatively described, but the power transmission devices 10B and 10C and the power reception devices 20B and 20C have the same configurations.

Figure 10:
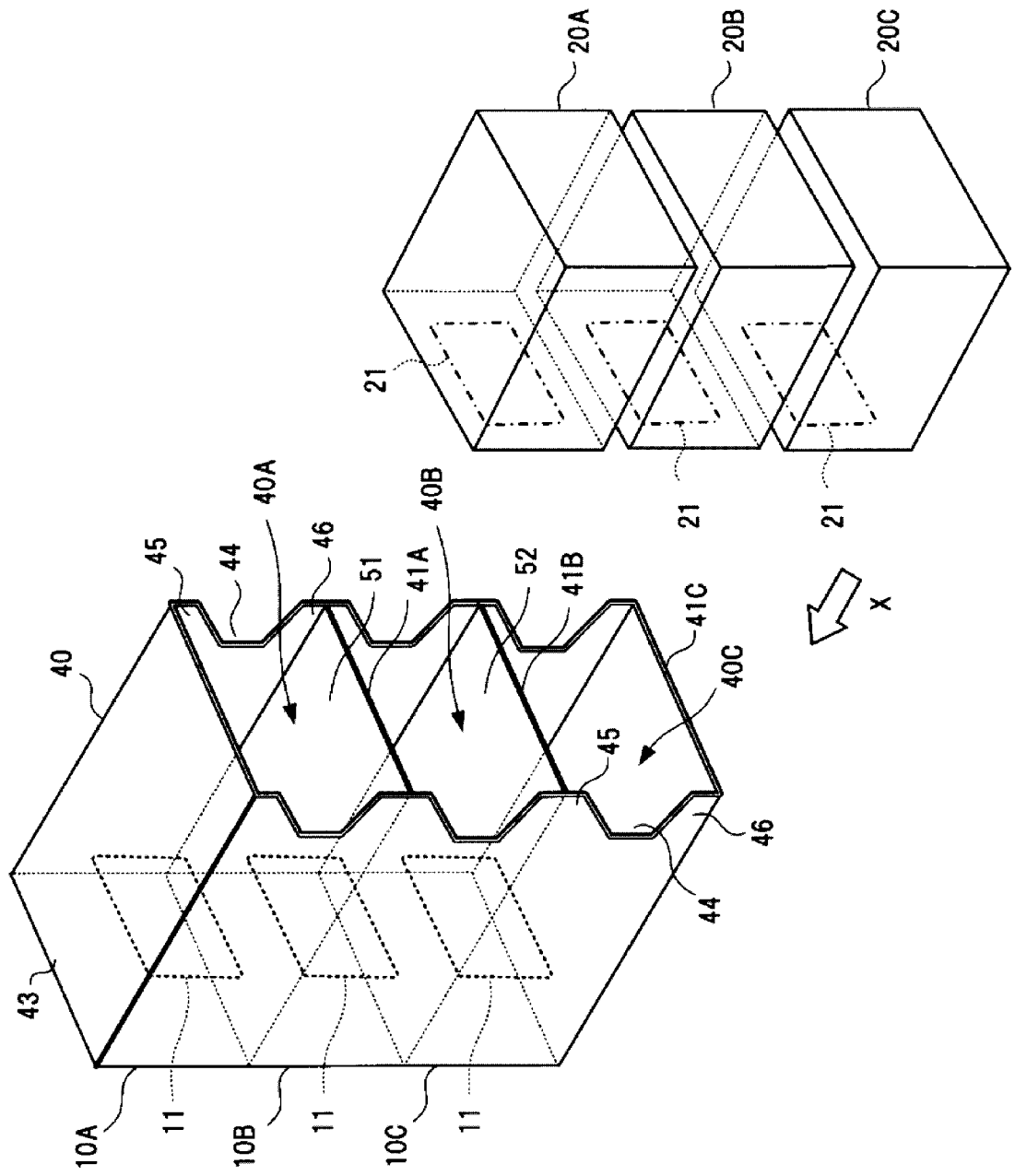
FIG. 10 is a perspective view illustrating a modification example of the contactless power transmission device according to the embodiment.

FIG. 10 is a perspective view illustrating a modification example of the contactless power transmission device according to the embodiment. In the example of FIG. 10, the shield case 40 is of a vertical type. The shield case 40 has a box shape, and the shield case 40 is partitioned into three shield rooms 40A, 40B, and 40C in a vertical direction by the partitioning plates 51 and 52 which are disposed in the shield case 40 in a horizontal direction.

The partitioning plates 51 and 52 are configured of metal or conductive members which have shielding effects similar to the shield case 40, and the shield rooms 40A, 40B, and 40C which are plurally partitioned by these partitioning plates 51 and 52 are formed. The power transmission devices 10A, 10B, and 10C are configured to be in the shield rooms 40A to 40C.

If the insertion direction of the power reception devices 20A to 20C is set as the arrow X, the power transmission coil 11 is attached to the inner side of each of the shield rooms 40A to 40C, in a direction orthogonal to the insertion direction X. In addition, the circuit part except for the power transmission coil 11 is disposed between the power transmission coil 11 and the inner-side end surface 43 of each of the shield rooms 40A to 40C.

The notches 44 are formed on both side surfaces of each of the shield rooms 40A to 40C of the shield case 40, from the edges of the opening portions 41A to 41C toward the inner side so that the power reception devices 20A to 20C are easily extracted. In the example of FIG. 10, it is not necessary to form the notch on the partitioning plates 51 and 52.

In this manner, even in a case where the shield rooms 40A to 40C are disposed to be lined up in the vertical direction, since the notch 44 is provided, the power reception devices 20A to 20C can be easily extracted. In addition, the notch 44 formed on the shield case 40 may have other shapes.

Figure 11:
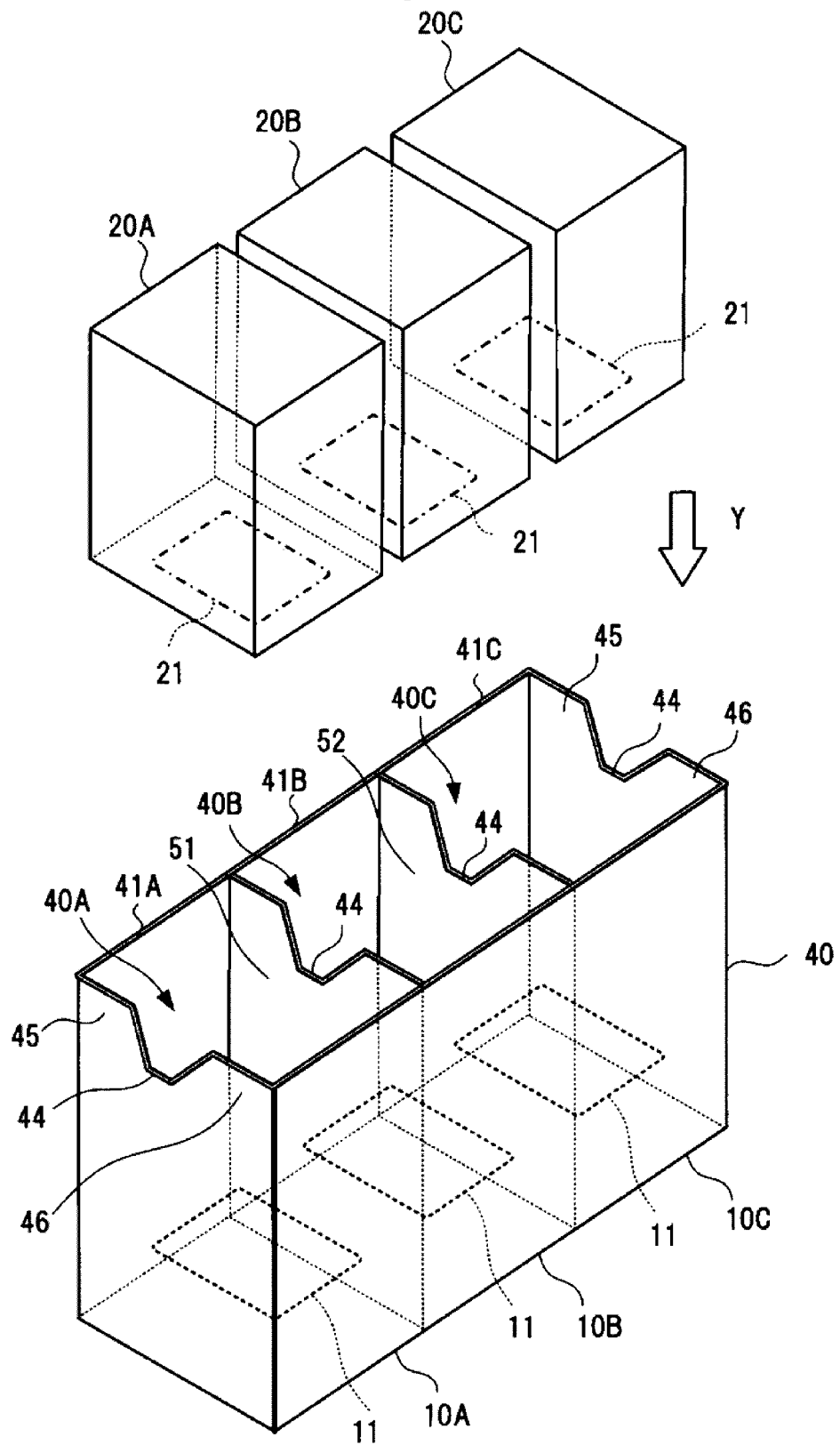
FIG. 11 is a perspective view illustrating another modification example of the contactless power transmission device according to the embodiment.

FIG. 11 is a perspective view illustrating another modification example of the contactless power transmission device according to the embodiment. In the example of FIG. 11, the shield case 40 is set to face upward, and the power reception devices 20A to 20C are inserted into the shield case from above the shield case (in Y direction) to be accommodated.

The shield case 40 has the same configuration as that in FIG. 4 except that by causing the shield case 40 to face upward, the power reception devices 20A to 20C are extracted upward from the shield case 40 and inserted into the shield case 40 from above the shield case 40, and thus the detailed description will not be provided.

In the example of FIG. 11, if the power reception devices 20A to 20C are inserted into the shield rooms 40A to 40C through the opening portions 41A to 41C, and are inserted up to a position where the power reception devices bump into the power transmission coils 11, the power transmission coil 11 and the power reception coil 21 face each other at a close range within 2 to 3 cm, and power can be transmitted in a contactless manner.

In a case where the power reception devices 20A to 20C are extracted from the shield rooms 40A to 40C, since the notch 44 is provided, the power reception devices 20A to 20C can be easily extracted. In addition, the notch 44 may have other shapes.

Figure 12:
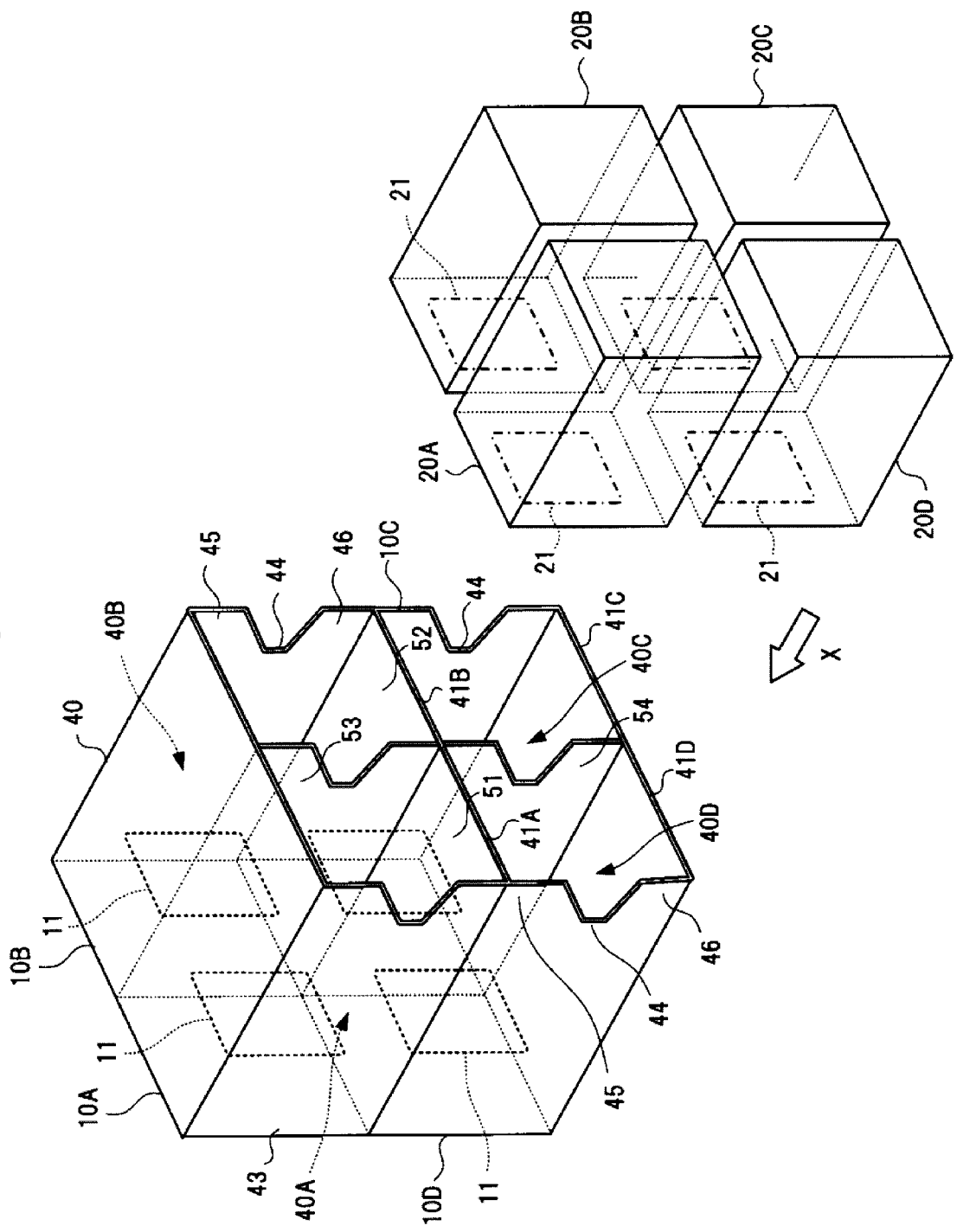
FIG. 12 is a perspective view illustrating still another modification example of the contactless power transmission device according to the embodiment.

FIG. 12 is a perspective view illustrating still another modification example of the contactless power transmission device according to the embodiment. In the example of FIG. 12, four power transmission devices 10A to 10D are disposed lengthwise and breadthwise. The shield case 40 has a box shape, and is partitioned into four shield rooms 40A to 40D by partitioning plates 51 to 54 that are assembled in a cross shape. The partitioning plates 51 to 54 are configured of metal or conductive members which have shielding effects similar to the shield case 40, and the shield rooms 40A to 40D which are plurally partitioned by these partitioning plates 51 to 54 are formed.

The power transmission devices 10A and 10B are configured to be in the upper shield rooms 40A and 40B, and the power transmission devices 10C and 10D are configured to be in the lower shield rooms 40C and 40D. Power reception devices 20A to 20D can respectively be extracted from and inserted into the shield rooms 40A to 40D through opening portions 41A to 41D.

In addition, the power transmission device 10A is described as an example, if the insertion direction of the power reception device 20A is set as an arrow X direction, the power transmission coil 11 is attached to the inner side of the shield room 40A which faces the opening portion 41A, in a direction orthogonal to the insertion direction X. In addition, the circuit part of the power transmission device 10A except for the power transmission coil 11 may be disposed between the power transmission coil 11 and the inner-side end surface 43 of the shield room 40A.

The notches 44 are formed on the side surfaces of the shield case 40, from the edges of the opening portions 41A to 41D toward the inner side, and similarly, the notches 44 are formed on the partitioning plates 53 and 54. Accordingly, in a case where the power reception devices 20A to 20D which are respectively inserted into the shield rooms 40A to 40D are extracted, due to the notches 44 being provided, the power reception devices 20A to 20D can be easily extracted.

The power transmission device 10A to 10D, and the power reception devices 20A to 20D illustrated in FIGS. 10 to 12 may adopt any configuration of FIGS. 7A to 9B.

According to the embodiments described above, in the contactless power transmission device including a plurality of power transmission devices, radiation noise can be sufficiently reduced, and the power reception device can be easily extracted and inserted. Therefore, it is possible to provide a device suitable for portable equipment.

Second Embodiment

Figure 13:
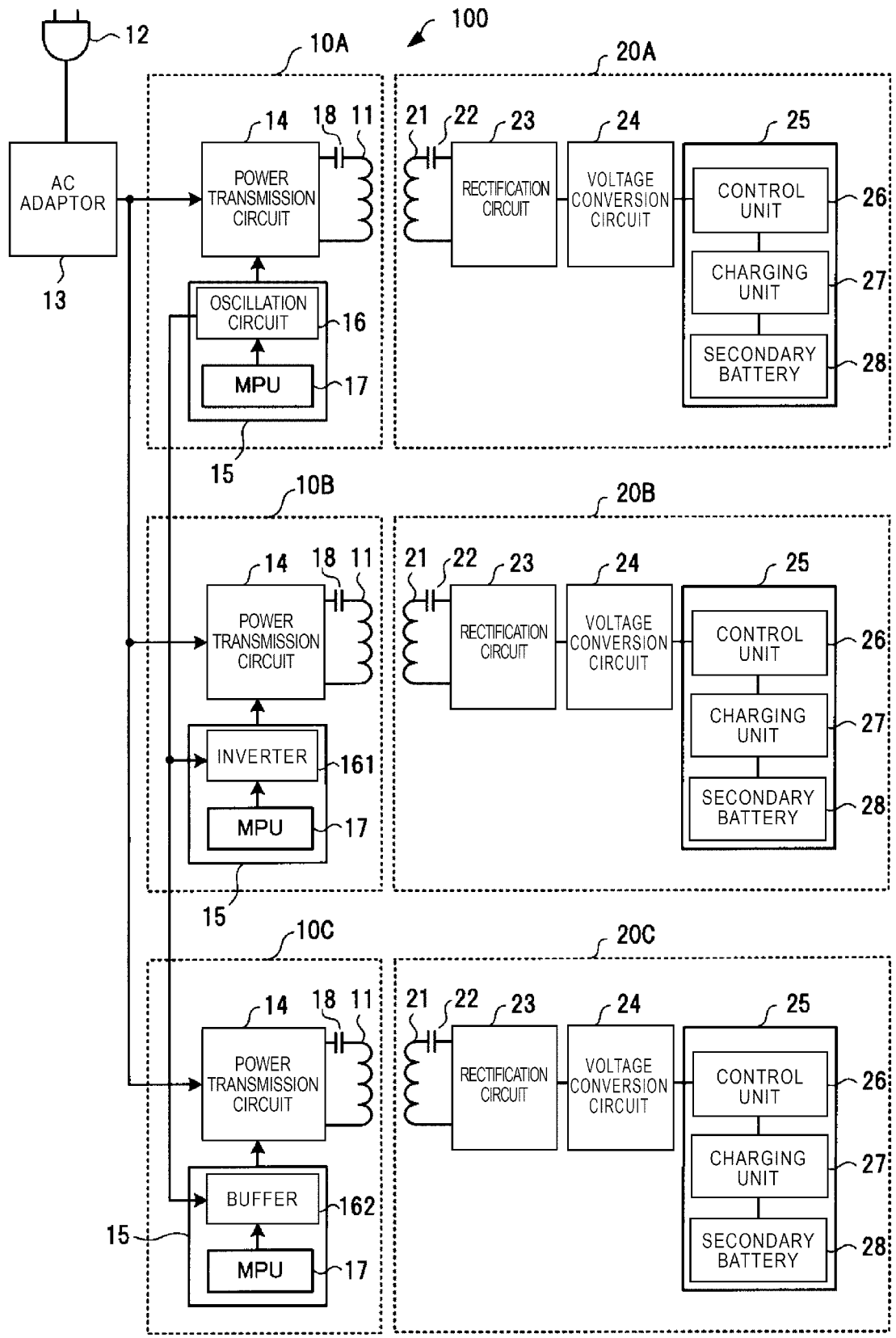
FIG. 13 is a block diagram illustrating a contactless power transmission/reception apparatus according to a second embodiment.

FIG. 13 is a block diagram illustrating the configuration of the contactless power transmission/reception apparatus 100 according to the second embodiment. The contactless power transmission/reception apparatus 100 of FIG. 13 includes a plurality of power transmission devices 10A to 10C which transmit power, and a plurality of power reception devices 20A to 20C which receive the transmitted power in a contactless manner.

DC power is supplied from the AC adaptor 13 to each of the power transmission devices 10A to 10C. Similar to FIG. 1, the power transmission devices 10A to 10C each have the power transmission circuit 14 and the control unit 15, the control unit 15 includes the oscillation circuit 16 and the MPU 17, and power is transmitted from the power transmission coil 11.

The power reception devices 20A to 20C each have a resonance circuit configured of the power reception coil 21 and the resonance capacitor 22, the rectification circuit 23, the voltage conversion circuit 24, and the load circuit 25. Power is transmitted to the power reception devices 20A to 20C by using electromagnetic coupling such as electromagnetic induction or magnetic field resonance between the power transmission coil 11 and the power reception coil 21.

In FIG. 13, the control unit 15 of the power transmission device 10B includes an inverter 161, and the control unit 15 of the power transmission device 10C includes a buffer 162. A clock signal output from the oscillation circuit 16 of the power transmission device 10A is input to the inverter 161, and the clock signal of which the phase is inverted by the inverter 161 is supplied to the power transmission circuit 14. Accordingly, the power transmission circuit 14 of the power transmission device 10B performs switching according to a signal of which the phase is inverted with respect to the clock signal output from the oscillation circuit 16 of the power transmission device 10A. Therefore, the phases of AC power output from the power transmission coils 11 of the power transmission device 10A and the power transmission device 10B are inverted from each other.

A clock signal, which has the same phase, output from the oscillation circuit 16 of the power transmission device 10A is input to the buffer 162. Accordingly, the power transmission circuit 14 of the power transmission device 10C performs switching according to a signal which has the same phase and is synchronized with the clock signal output from the oscillation circuit 16 of the power transmission device 10A. Therefore, the phases of AC power output from the power transmission coils 11 of the power transmission device 10A and the power transmission device 10C are the same and synchronized with each other.

In the contactless power transmission/reception apparatus 100 illustrated in FIG. 13, by the action of combining the AC power output from the power transmission coil 11 of the power transmission device 10A and the AC power output from the power transmission coil 11 of the power transmission device 10B which have inverted phases, electromagnetic waves which become noise are canceled in a space separated from the contactless power transmission device, and thus it is possible to obtain effects of reducing noise.

In other words, a state in which the electromagnetic waves generated from the AC power having the same phase, and the electromagnetic waves generated from the AC power having the inverted phase are canceled is used.

In a space separated from the shield case 40 by about 1 m to 10 m, in simple consideration of the volume of the electromagnetic waves unnecessarily radiated from the contactless power transmission device, since the phases of the electromagnetic waves radiated from the power transmission coil 11 of each of the power transmission device 10A and the power transmission device 10B are inverted from each other, and the electromagnetic waves become to be canceled, it is possible to mostly neglect the radiation of the electromagnetic waves.

Then, the volume of the electromagnetic waves radiated from the power transmission coil 11 of the power transmission device 10C may only be considered. Actually, the electromagnetic waves radiated from the power transmission coil 11 of each of three power transmission devices 10A to 10C interfere with each other, and are affected by the reflection in a space, and thus the state in which the electromagnetic waves are canceled cannot be simply calculated. However, the amount of the electromagnetic waves radiated from one power transmission coil, among three power transmission coils, may be simply considered.

Here, a case in which the AC power from the power transmission coil 11 of each of the power transmission devices 10A to 10C is output asynchronously, without using the above-described effects of cancelling the electromagnetic waves, is considered. In a space separated from the shield case 40 by about 1 m to 10 m, if the peak value of the combined electromagnetic waves radiated from the power transmission coils 11 is assumed, the combined amount is different depending on the phase condition of the electromagnetic waves, but if all the phases are the same, the electromagnetic waves output from the power transmission coils 11 are superimposed so as to have a volume which is about three times the volume when the electromagnetic waves are output from one power transmission coil 11.

In the configuration of FIG. 13, in a case where the inverter 161 is configured to be a buffer, and the AC power output from the power transmission coil 11 of each of the power transmission devices 10A to 10C which has the same phase is synchronously output, the electromagnetic waves output from three power transmission coils 11 are superimposed so as to have a volume which is always about three times the volume when the electromagnetic waves are output from one power transmission coil 11.

As described in FIG. 13, by providing the inverter 161 and the buffer 162, it is possible to provide a contactless power transmission/reception apparatus which can sufficiently reduce radiation noise.

In FIG. 13, a case in which three power transmission devices 10A to 10C and three power reception devices 20A to 20C are provided is described, but the number of each of power transmission devices and power reception devices may be even, for example, two or four. If the number of power transmission devices is even, by configuring the electromagnetic waves radiated from adjacent power transmission coils to be just canceled, it is possible to further reduce the amount of radiated electromagnetic waves compared to a case where the number of power transmission devices is odd.

As illustrated in FIG. 4 and FIGS. 10 to 12, in a case where a plurality of power transmission devices are disposed to be lined up, it is preferable that the phases of the AC power output from the power transmission coils of the adjacent power transmission devices are inverted from each other.

In FIG. 13, the switches 19B and 19C as illustrated in FIG. 1 may be provided between the AC adaptor 13 and the power transmission device 10B, and between the AC adaptor 13 and the power transmission device 10C. By providing the switches 19B and 19C, it is possible to supply DC power to the power transmission devices 10B and 10C as necessary, and thus if there is no need to operate the power transmission devices 10B and 10C, the switches 19B and 19C may be turned off.

According to the second embodiment described above, in the contactless power transmission device including a plurality of power transmission devices, radiation noise can be further sufficiently reduced, and the power reception device can be easily extracted and inserted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A contactless power transmission device which transmits power to a power reception device in a contactless manner, the contactless power transmission device comprising:
a shield case which has an opening portion at one end portion thereof, and is partitioned into a plurality of shield rooms by partitioning plates;
a power transmission circuit which is for transmitting power and is disposed to correspond to each of the plurality of shield rooms;
a plurality of power transmission coils which are disposed on the inner side in the plurality of shield rooms when viewed from the opening portion, and transmit AC power from the power transmission circuit to the power reception device; and
a notch which is formed on side surfaces of the shield case or the partitioning plates, from the opening portion toward the inner side such that both sides of a rear end portion of the power reception device inserted into the plurality of shield rooms is exposed through the notch and can be held at the rear end portion exposed through the notch, wherein the rear end portion of the power reception device is positioned further on an inner side of the opening portion than the shield case, and wherein protrusions are generated on an upper side and a lower side of the notch on the side surfaces of the shield case.

2. The device according to claim 1,
wherein the notch is formed in a curved shape at a central portion of the side surfaces of the shield case or the partitioning plates, from the opening portion toward the inner side.

3. The device according to claim 1,
wherein power transmission coils of the plurality of power transmission coils are disposed on an respective inner-side surfaces of the plurality of shield rooms, which face the opening portion, so as to be orthogonal to or parallel with an insertion direction of the power reception device.

4. The device according to claim 1,
wherein the power transmission circuit disposed in each of the plurality of shield rooms is operated based on a clock signal, and clock signals supplied to adjacent power transmission circuits are synchronized with each other with the phases thereof being inverted.

5. A contactless power transmission/reception apparatus comprising:
a power reception device; and
a power transmission device which transmits power to the power reception device in a contactless manner,
wherein the power transmission device includes
a shield case which has an opening portion at one end portion thereof, and is partitioned into a plurality of shield rooms by partitioning plates,
a power transmission circuit which is for transmitting power and is disposed to correspond to each of the plurality of shield rooms,
a plurality of power transmission coils which are disposed on the inner side in the plurality of shield rooms when viewed from the opening portion, and transmit AC power from the power transmission circuit to the power reception device, and
a notch which is formed on side surfaces of the shield case or the partitioning plates, from the opening portion toward the inner side such that both sides of a rear end portion of the power reception device inserted into the plurality of shield rooms is exposed at the notch and can be held at the rear end portion exposed at the notch, wherein the rear end portion of the power reception device is positioned further on an inner side of the opening portion than the shield case, and wherein protrusions are generated on an upper side and a lower side of the notch on the side surfaces of the shield case, and
wherein the power reception device includes
a housing which can be accommodated in any of the plurality of shield rooms,
a power reception coil which is disposed in the housing so as to face the plurality of power transmission coils when the housing is accommodated in the shield case, and receives the AC power transmitted from the plurality of power transmission coils in a contactless manner, and
a power reception circuit which is provided in the housing, and converts the AC power received by the power reception coil to DC power.

* * * * *